United States Patent [19]

Soule, Jr. et al.

[11] 3,710,325

[45] Jan. 9, 1973

[54] PLUGBOARD SELECTION OF REGISTER ORDERS FOR EXTRACTION OF CONTENTS

[75] Inventors: Winsor Soule, Jr., Berkley; John Efstathioun, Oakland; Leif Andreasen, Newark, all of Calif.

[73] Assignee: SCM Corp., New York, N.Y.

[22] Filed: March 24, 1970

[21] Appl. No.: 24,905

Related U.S. Application Data

[62] Division of Ser. No. 434,265, Feb. 23, 1965, Pat. No. 3,522,416.

[52] U.S. Cl. ....................340/172.5

[51] Int. Cl. ........G06f 9/00, G06f 15/00, G06k 15/00

[58] Field of Search ................340/172.5; 197/19, 20

[56] References Cited

UNITED STATES PATENTS

| | | | |
|---|---|---|---|
| 3,291,277 | 12/1966 | Borrelli | 197/20 |
| 3,316,538 | 4/1967 | Piloty et al. | 340/172.5 |
| 3,351,917 | 11/1967 | Shimabururo | 340/172.5 |
| 3,309,671 | 3/1967 | Lekven | 340/172.5 |
| 3,251,037 | 5/1966 | Coil et al. | 340/172.5 |
| 3,109,162 | 10/1963 | Wolensky | 340/172.5 |
| 3,134,091 | 5/1964 | Shugart | 340/172.5 |
| 3,278,904 | 10/1966 | Lerven | 340/172.5 |

*Primary Examiner*—Paul J. Henon
*Assistant Examiner*—Ronald F. Chapuran
*Attorney*—Armand G. Guibert

[57] ABSTRACT

Controls for extracting digits of a register's contents before transfer to a utilization device by use of a plugboard in conjunction with the usual digit position identification signals.

6 Claims, 2 Drawing Figures

PLUGBOARD SELECTION OF REGISTER ORDERS FOR EXTRACTION OF CONTENTS

This is a division of application Ser. No. 434,265, now U.S. Pat. No. 3,522,416, filed Feb. 23, 1965, by Winsor Soule, Jr. et al and entitled "Input-Output Controls."

The particular invention claimed herein relates to output controls for electronic digital computers, particularly those of the externally programmed type in which operating instructions and data are stored in record media such as punched paper tape.

The novelty of the system disclosed in the parent patent is that the externally programmed computer instructions on the punched paper tape are variable-length series of coded characters (referred to hereinafter as instruction words) presented serially in character-by-character fashion, each character representing an instruction defining an operation--including those of an algebraic nature, an address, or an output format selection. The output format selection characters are not conclusive, being subject to modification by variable arrangements of the patch-cords on a plugboard forming part of the program controls.

Specifically, the feature claimed herein relates to selective extraction of a portion of the contents of a register during output, "extraction" referring to the substitution of zeros for digits read from the selected register portion. Greater flexibility without sacrifice of simplicity is achieved through use of the plugboard, together with an already present digit counter, for controlling this function.

SUMMARY OF THE INVENTION

The invention claimed herein provides for the selective extraction of predetermined portions of the contents of a register when presented to the output of the computer, selection being made according to the program in a plugboard and being effected through use of the usual signals identifying the digit positions of the computer register.

Further, another embodiment of the invention provides two extraction programs alternatively effective according to the sensing of a selection character in the external program of the computer.

DISCLOSURE OF THE INVENTION

The drawings and description of parent U.S. Pat. No. 3,522,416 are incorporated by reference. The essential material therein which applies to present claims includes at least FIGS. 1, 3, 6*a*,*b*, 12, 14, and 17*a*,*b*, together with the general description of output, Col. 19, line 50 through Col. 26, line 17, and the specific discussion of the extract operation, from line 18 of Col. 26 to line 25 of Col. 27.

BRIEF DESCRIPTION OF THE APPENDED DRAWING

Figure 14A:
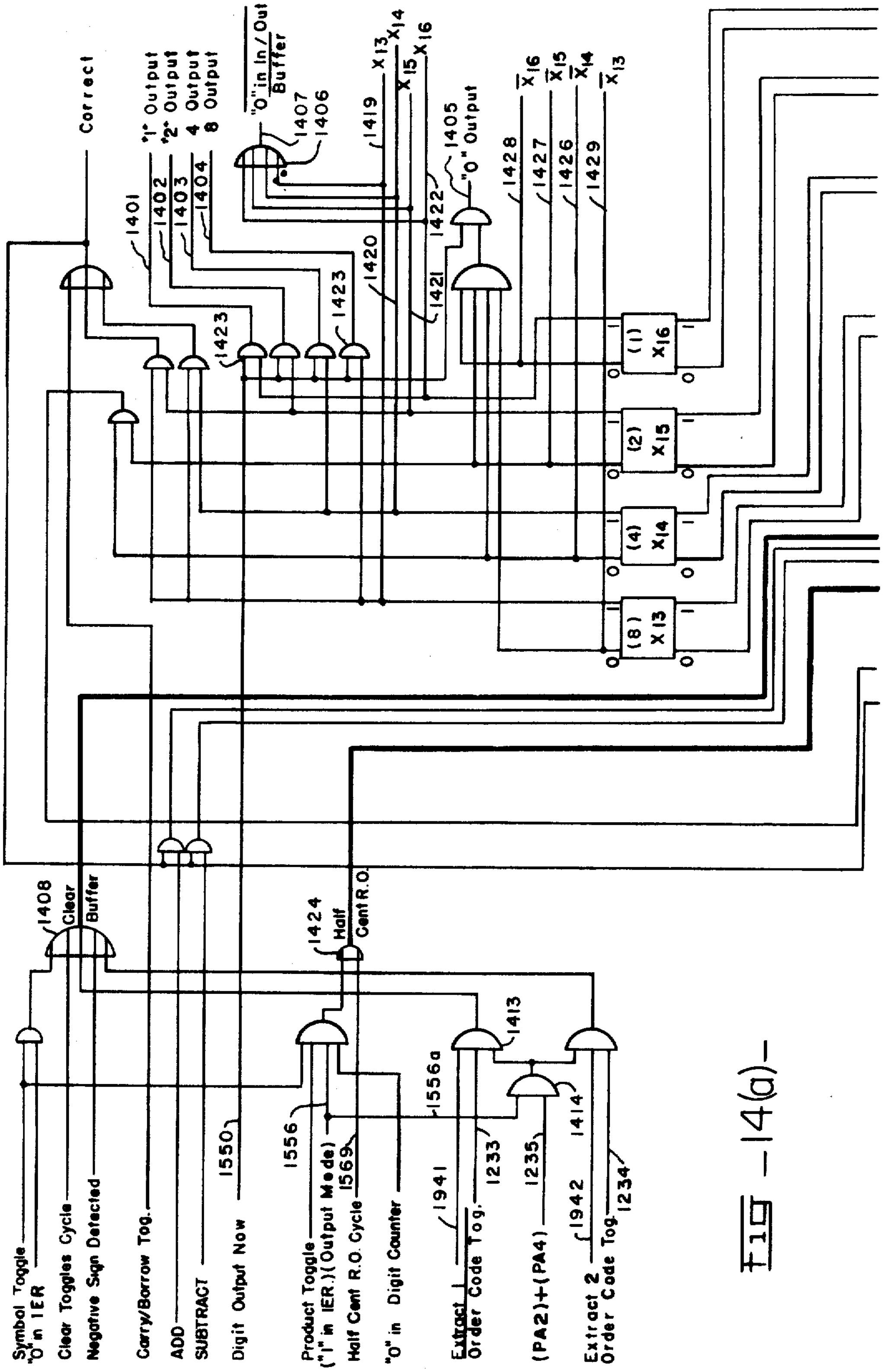
Figure 19D:
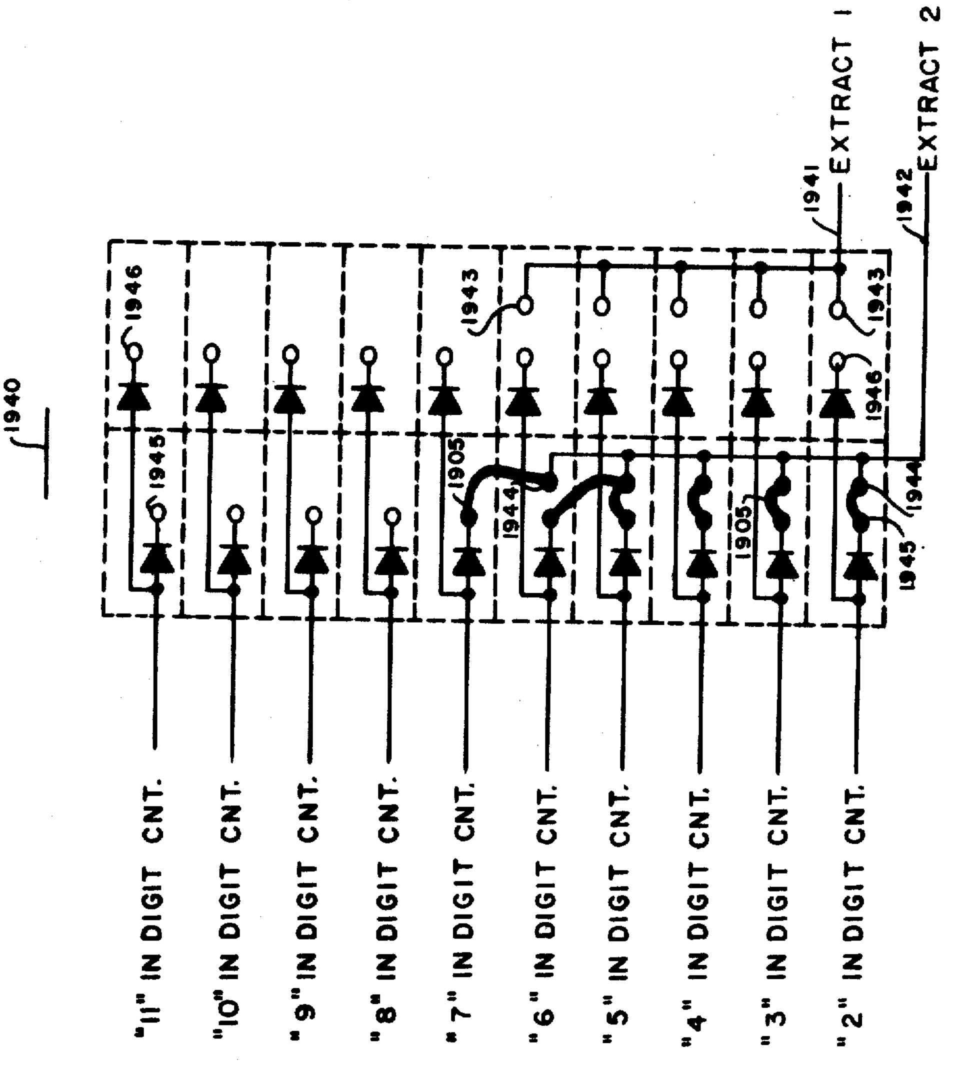

FIG. 14*a* – a logic diagram of the input/output buffer through which data enter and leave the Processor on the way to and from memory, respectively; and FIG. 19*d* – a combined logic and circuit diagram showing some circuit elements of the output control plugboard, including sample wiring, for controlling the extraction of chosen digits in the output from a selected register.

We claim:

1. In a digital computer having a register with a plurality of digit positions and an output device for presenting the information in said register, the combination of:
   - cyclic means uniquely defining each said digit position;
   - a first timing pulse;
   - a second timing pulse following said first timing pulse;
   - means for reading out the contents of the register, one digit at a time, under control of said cyclic means;
   - a one digit buffer register for storing the output of said reading out means;
   - means for transferring the digit in said buffer register to the output device in response to said second timing pulse;
   - a plurality of signal lines responsive to said cyclic means and equal in number to the number of digit positions;
   - normally disabled means for clearing a digit out of said buffer register in response to said first timing pulse;
   - means to enable said clearing means comprising manual means for connecting selected ones of said signal lines to said clearing means, whereby predetermined ones of said digits are cleared out of said buffer register before they can be sent to the output device.

2. A digital computer as defined in claim 1, wherein the manual connecting means is a plugboard.

3. A digital computer, as defined in claim 1, wherein said buffer register comprises four toggles, each toggle having a reset input:
   - said position-defining means is a counter; and
   - said clearing means for said buffer register comprises four pulse gates triggered by said first timing pulse when armed by outputs from said signal lines, each of said pulse gates connected to the reset input of one of said toggles.

4. A digital computer as defined in claim 1, wherein said manual means connects two groups of said signal lines respectively to a first common lead and to a second common lead, and further including:
   - a bi-stable element settable from a first state to a second state;
   - a first And gate connected to said clearing means, and giving an output in joint response to an output on said first common lead and to the first state of said bi-stable element;
   - a second And gate connected to said clearing means, and giving an output in joint response to an output on said second common lead and the second state of said bi-stable element.

5. A digital computer as defined in claim 4, in combination with record media having a discrete character therein, and a reader for sensing the characters in said record media, said bi-stable element being settable to said second state in response to the sensing of said discrete character.

6. A digital computer, as defined in claim 4, wherein said buffer register comprises four toggles, each toggle having a reset input;
   - said position-defining means is a counter; and
   - said clearing means for said buffer register comprises four pulse gates triggered by said first timing pulse when armed by outputs from said signal lines, each of said pulse gates being connected to the reset input of one of said toggles.

* * * * *